US00RE50378E

(19) United States
(12) Reissued Patent
Kim et al.

(10) Patent Number: US RE50,378 E
(45) Date of Reissued Patent: Apr. 8, 2025

(54) METHOD AND APPARATUS FOR CONTROLLING RECEPTION OF SCPTM SERVICE USING SCPTM-RNTI

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

(21) Appl. No.: 17/725,349

(22) Filed: Apr. 20, 2022

Related U.S. Patent Documents

Reissue of:
(64) Patent No.: 10,638,272
Issued: Apr. 28, 2020
Appl. No.: 15/542,305
PCT Filed: Jan. 8, 2016
PCT No.: PCT/KR2016/000204
§ 371 (c)(1),
(2) Date: Jul. 7, 2017
PCT Pub. No.: WO2016/111589
PCT Pub. Date: Jul. 14, 2016

U.S. Applications:
(60) Provisional application No. 62/101,393, filed on Jan. 9, 2015.

(51) Int. Cl.
*H04W 4/06* (2009.01)
*H04W 72/12* (2023.01)
(Continued)

(52) U.S. Cl.
CPC ..... *H04W 4/06* (2013.01); *H04W 72/12* (2013.01); *H04W 72/20* (2023.01); *H04W 76/27* (2018.02);
(Continued)

(58) Field of Classification Search
None
See application file for complete search history.

(56) References Cited

U.S. PATENT DOCUMENTS

2004/0057387 A1* 3/2004 Yi ..... H04L 12/18 370/252
2004/0185837 A1* 9/2004 Kim ..... H04H 60/91 455/414.3
(Continued)

FOREIGN PATENT DOCUMENTS

CN 1863400 A * 11/2006
CN 101626545 A * 1/2010 ..... H04W 72/00
EP 2 278 830 A1 1/2011

OTHER PUBLICATIONS

3GPP TS 36.300 v12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," pp. 1-251, Dec. 2014. (Year: 2014)*
(Continued)

*Primary Examiner* — John M Hotaling, II
(74) *Attorney, Agent, or Firm* — Birch, Stewart, Kolasch & Birch, LLP

(57) ABSTRACT

Provided is a method for receiving, by a terminal, a single-cell point-to-multipoint (SCPTM) service in a wireless communication system. The terminal receives a list of available SCPTM services from a serving cell, the list of available SCPTM services including SCPTM-RNTIs corresponding to the available SCPTM services. The terminal may store a SCPTM-RNTI corresponding to an interested SCPTM service among the received list of available SCPTM services and may receive the interested SCPTM service using the stored SCPTM-RNTI corresponding to the interested SCPTM service. Further, provided is a method for interrupting, by a terminal, reception of a SCPTM service in a wireless communication system. The terminal may determine whether or not to interrupt the reception of the SCPTM
(Continued)

service from a serving cell, and when determining to interrupt the reception of the SCPTM service, may release the SCPTM-RNTI corresponding to the SCPTM service.

6 Claims, 8 Drawing Sheets

(51) Int. Cl.

| | |
|---|---|
| ***H04W 72/20*** | (2023.01) |
| ***H04W 76/27*** | (2018.01) |
| ***H04W 76/30*** | (2018.01) |
| ***H04W 76/34*** | (2018.01) |
| *H04L 1/1812* | (2023.01) |
| *H04W 8/26* | (2009.01) |
| *H04W 76/28* | (2018.01) |
| *H04W 88/16* | (2009.01) |

(52) U.S. Cl.
CPC ..... *H04W 76/30* (2018.02); *H04W 76/34* (2018.02); *H04L 1/1812* (2013.01); *H04W 8/26* (2013.01); *H04W 76/28* (2018.02); *H04W 88/16* (2013.01)

(56) References Cited

U.S. PATENT DOCUMENTS

2004/0266440 A1* 12/2004 Fuchs ..... H04L 12/1836 455/445
2005/0118992 A1* 6/2005 Jeong ..... H04W 4/06 455/422.1
2007/0213080 A1* 9/2007 Kuo ..... H04L 12/185 455/466
2009/0213775 A1* 8/2009 Rey ..... H04L 12/18 370/312
2010/0061247 A1* 3/2010 He ..... H04L 12/189 370/241
2010/0309836 A1* 12/2010 Sugawara ..... H04W 72/1231 370/312
2010/0329167 A1* 12/2010 Linden ..... H04W 72/005 370/312
2012/0294269 A1 11/2012 Yamada et al.
2013/0039248 A1* 2/2013 Koskinen ..... H04W 72/005 370/312
2013/0055318 A1* 2/2013 Wang ..... H04W 72/005 725/62
2014/0031027 A1* 1/2014 Dalsgaard ..... H04W 36/0088 455/418
2014/0080475 A1* 3/2014 Gholmieh ..... H04W 48/16 455/422.1
2014/0233451 A1 8/2014 Yamada et al.
2014/0286225 A1* 9/2014 Yu ..... H04W 4/08 370/312
2014/0293866 A1* 10/2014 Chang ..... H04W 72/30 370/312
2015/0078245 A1* 3/2015 Anchan ..... H04M 13/00 370/312
2015/0119023 A1* 4/2015 Wang ..... H04W 4/06 455/432.1
2015/0304122 A1* 10/2015 Pazos ..... H04L 12/1845 370/312
2017/0366363 A1* 12/2017 Hong ..... H04W 72/23
2018/0077257 A1* 3/2018 Wang ..... H04L 67/1014

OTHER PUBLICATIONS

Huawei, "MBMS Service Continuity Scenarios", R3-071948, 3GPP TSG RAN WG3 Meeting #57bis, Sophia Antipolis, France, Oct. 8-11, 2007, 2 pages.

* cited by examiner

METHOD AND APPARATUS FOR CONTROLLING RECEPTION OF SCPTM SERVICE USING SCPTM-RNTI

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application is the National Phase of PCT International Application No. PCT/KR2016/000204, filed on Jan. 8, 2016, which claims priority under 35 U.S.C. 119(e) to U.S. Provisional Application No. 62/101,393, filed on Jan. 9, 2015, all of which are hereby expressly incorporated by reference into the present application.]

*This Application is a Reissue of U.S. Pat. No. 10,638,272 issued on Apr. 28, 2020, which is a National Phase of PCT International Application No. PCT/KR2016/000204, filed on Jan. 8, 2016, which claims priority under 35 U.S.C. 119(e) to U.S. Provisional Application No. 62/101,393, filed on Jan. 9, 2015, all of which are hereby expressly incorporated by reference into the present application.*

BACKGROUND OF THE INVENTION

Field of the Invention

The present invention relates to a wireless communication system, and more particularly, to a method in which a user equipment (UE) receives a single-cell point-to-multipoint (SCPTM) service by using an SCPTM-radio network temporary identity (RNTI) or stops receiving the service, and an apparatus supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain is not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

SUMMARY OF THE INVENTION

Even if a single-cell point-to-multipoint (SCPTM) service is broadcast, since it is transmitted through a dedicated traffic channel (DTCH), a user equipment (UE) may require a new radio network temporary identity (RNTI) for SCPTM reception. However, if the new RNTI for SCPTM service is allocated and released through only dedicated signaling, the UE of an RRC_IDLE mode cannot receive the SCPTM transmission. Therefore, the present invention proposes a method in which the UE of the RRC_IDLE mode acquires an SCPTM-RNTI to receive a corresponding SCPTM service and an apparatus supporting the method. In addition, the present invention proposes a method in which the UE of the RRC_IDLE mode releases the SCPTM-RNTI to stop receiving a corresponding SCPTM service and an apparatus supporting the method.

According to one exemplary embodiment, there is provided a method in which a UE stops receiving an SCPTM service in a wireless communication system. The UE may determine whether to stop receiving the SCPTM service from a serving cell, and if it is determined to stop receiving the SCPTM service, may release an SCPTM-RNTI corresponding to the SCPTM service.

The method may further include stopping monitoring a PDCCH corresponding to the SCPTM service.

The method may further include stopping decoding a PDCCH corresponding to the SCPTM service.

The UE may be in an RRC_IDLE state.

The SCPTM-RNTI may be an RNTI newly defined to receive the SCPTM service.

According to another embodiment, there is provided a method in which a UE receives an SCPTM service in a wireless communication system. The UE may receive a list of available SCPTM services from a serving cell, store an SCPTM-RNTI corresponding to an interested SCPTM service among the received list of available SCPTM services, and receive the interested SCPTM service by using the stored SCPTM-RNTI corresponding to the interested SCPTM service. The list of available SCPTM services may include an SCPTM-RNTI corresponding to the available SCPTM service.

The method may further include: determining whether to stop receiving the interested SCPTM service from the serving cell; and if it is determined to stop receiving the interested SCPTM service, releasing an SCPTM-RNTI corresponding to the interested SCPTM service. The method may further include stopping monitoring a PDCCH corresponding to the interested SCPTM service.

The UE may be in an RRC_IDLE state.

There may be one or more SCPTM-RNTIs corresponding to the interested SCPTM service.

The list of available SCPTM services may be broadcast through a broadcast control channel (BCCH) or a multicast control channel (MCCH).

The list of available SCPTM services may include at least any one of a service identity, a temporary mobile group identity (TMGI), and a session identity.

According to another embodiment, there is provided a UE for stopping receiving an SCPTM service in a wireless communication system. The UE may include: a memory; a transceiver; and a processor operatively coupled to the memory and the transceiver. The processor may be configured for: determining whether to stop receiving the SCPTM service from a serving cell; if it is determined to stop receiving the SCPTM service, releasing an SCPTM-RNTI corresponding to the SCPTM service.

The processor may be configured for stopping decoding a PDCCH corresponding to the SCPTM service.

A user equipment (UE) of an RRC_IDLE mode can be controlled to receive or stop a single-cell point-to-multipoint (SCPTM) service by using an SCPTM-radio network temporary identity (RNTI).

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
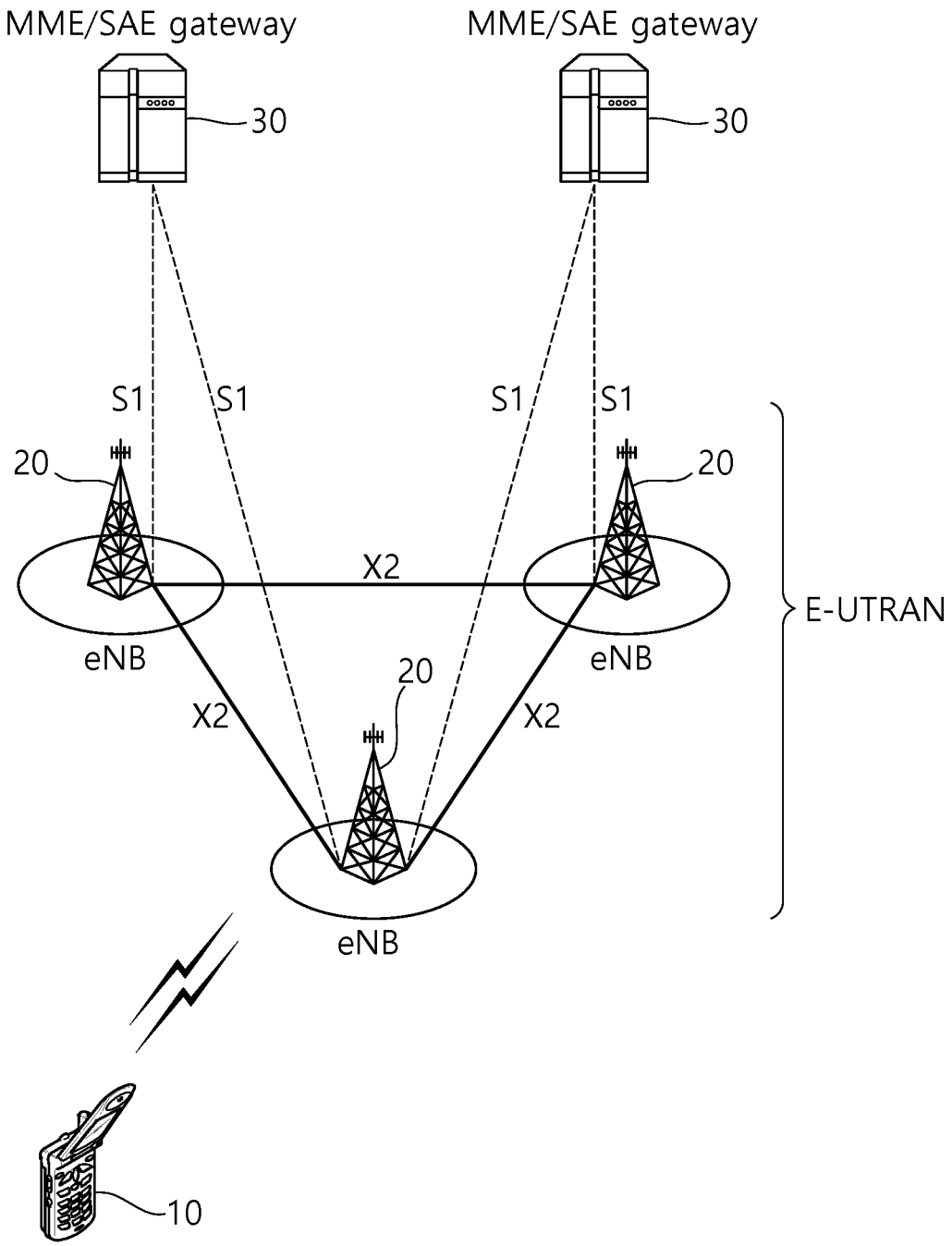
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement. DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
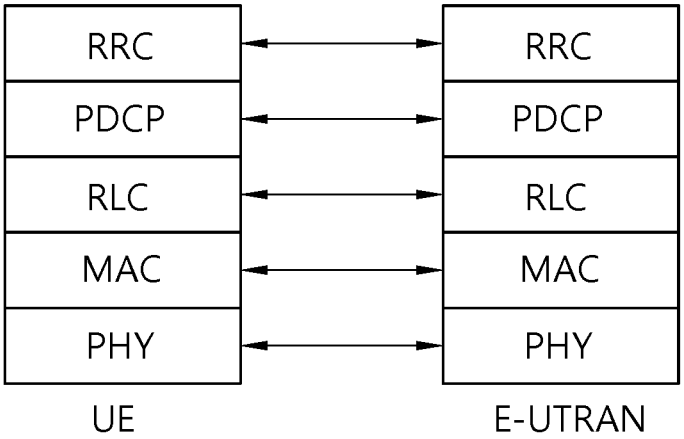
FIG. 2 shows a control plane of a radio interface protocol of an LTE system.
Figure 3:
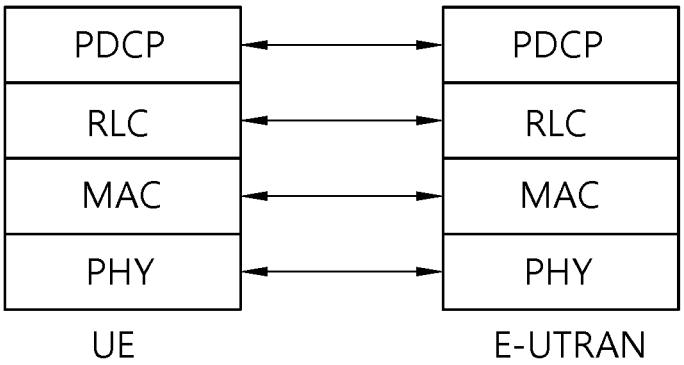
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
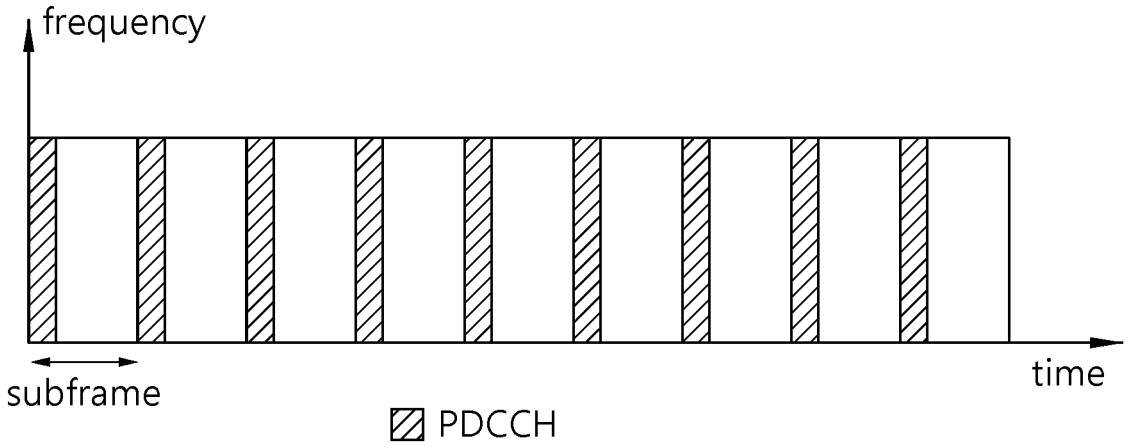
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, an MBMS and a multicast/broadcast single frequency network (MBSFN) are described in detail.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

A multicast control channel (MCCH) is a downlink channel used to perform point-to-multipoint transmission on MBMS control information from the network to the UE. A transmission method of an MBMS service includes single-cell point-to-multipoint (SCPTM) transmission and multimedia broadcast multicast service single frequency network (MBSFN) transmission. While identifiable signals are transmitted simultaneously in a plurality of cells in the MBSFN transmission, the MBMS service is transmitted in a single cell in the SCPTM transmission. Therefore, the SCPTM transmission differs from the MBSFN transmission in a sense that synchronization is not necessary between cells. In addition, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is determined that a service desired by the UE is an SCPTM service through the MCCH, the UE may acquire a corresponding RNTI value and read a PDCCH through a corresponding RNTI to receive the SCPTM service.

Hereinafter, a radio network temporary identifier (RNTI) is described.

A BS determines a PDCCH format according to DCI to be transmitted to a UE, attaches a cyclic redundancy check (CRC) to the DCI, and masks a unique identifier to the CRC according to an owner or usage of the PDCCH, and the unique identifier is referred to as a radio network temporary identifier (RNTI). Table 1 below shows a type of RNTI.

TABLE 1

| RNTI | purpose | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

Table 2 shows a range of RNTI values.

TABLE 2

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |

TABLE 2-continued

| Value (hexadecimal) | RNTI |
|---|---|
| FFFE | P-RNTI |
| FFFF | SI-RNTI |

The existing RNTI (e.g., C-RNTI or SPS-RNTI) for dedicated traffic channel (DTCH) reception may be allocated only to a UE of an RRC_CONNECTED mode through dedicated signaling. Even if SCPTM transmission is broadcast, since the SCPTM transmission is achieved through the DTCH, the UE may require a new RNTI for SCPTM reception. However, if the new RNTI for SCPTM is allocated and released through only the dedicated signaling, the UE of the RRC_IDLE mode cannot receive the SCPTM transmission. Therefore, the present invention proposes a method in which the UE of the RRC_IDLE mode acquires the SCPTM-RNTI. In addition, the present invention proposes a method in which the UE of the RRC_IDLE mode releases the SCPTM-RNTI.

First, a method in which a UE in an RRC_IDLE mode acquires an SCPTM-RNTI is described according to an embodiment of the present invention.

Step 1: The UE may receive a list of available SCPTM services from a serving cell. The list of available SCPTM services may be provided through SCPTM transmission. The list of available SCPTM services may be broadcast from the serving cell through a BCCH or MCCH logical channel. The list of available SCPTM services may include an SCPTM-RNTI corresponding to the available SCPTM service and corresponding service identities (or a temporary mobile group identity (TMGI), a session identity). The SCPTM-RNTI is an identification for SCPTM reception. The same SCPTM-RNTI may be allocated to a plurality of UEs. The SCPTM-RNTI may be allocated for each SCPTM service.

Step 2: If the UE is receiving an SCPTM service or is scheduled to receive it, the UE may consider the service as an interested SCPTM service. The UE may know an SCPTM service identity as a user service description (USD).

Step 3: If the SCPTM service interested by the UE is included in the list of available SCPTM services, the UE may store an SCPTM-RNTI corresponding to the interested SCPTM. Preferably, the UE may store one SCPTM-RNTI according to a user's interest, and may store a plurality of SCPTM-RNTIs.

Step 4: The UE may receive the interested SCPTM service through SCPTM transmission by using the stored SCPTM-RNTI corresponding to the interested SCPTM service.

Next, a method in which a UE in an RRC_IDLE mode releases an SCPTM-RNTI is described according to an embodiment of the present invention.

Step 1: If the UE determines to stop receiving an SCPTM service through SCPTM transmission, the UE may no longer consider the service as the interested SCPTM service.

Step 2: If the UE is not interested in the SCPTM service provided from the serving cell, the UE may release an SCPTM-RNTI corresponding to the SCPTM service to avoid unnecessary monitoring and decoding of a PDCCH. It may be unnecessary for the UE to monitor a subframe (PDCCH) corresponding to the SCPTM service.

Figure 5:
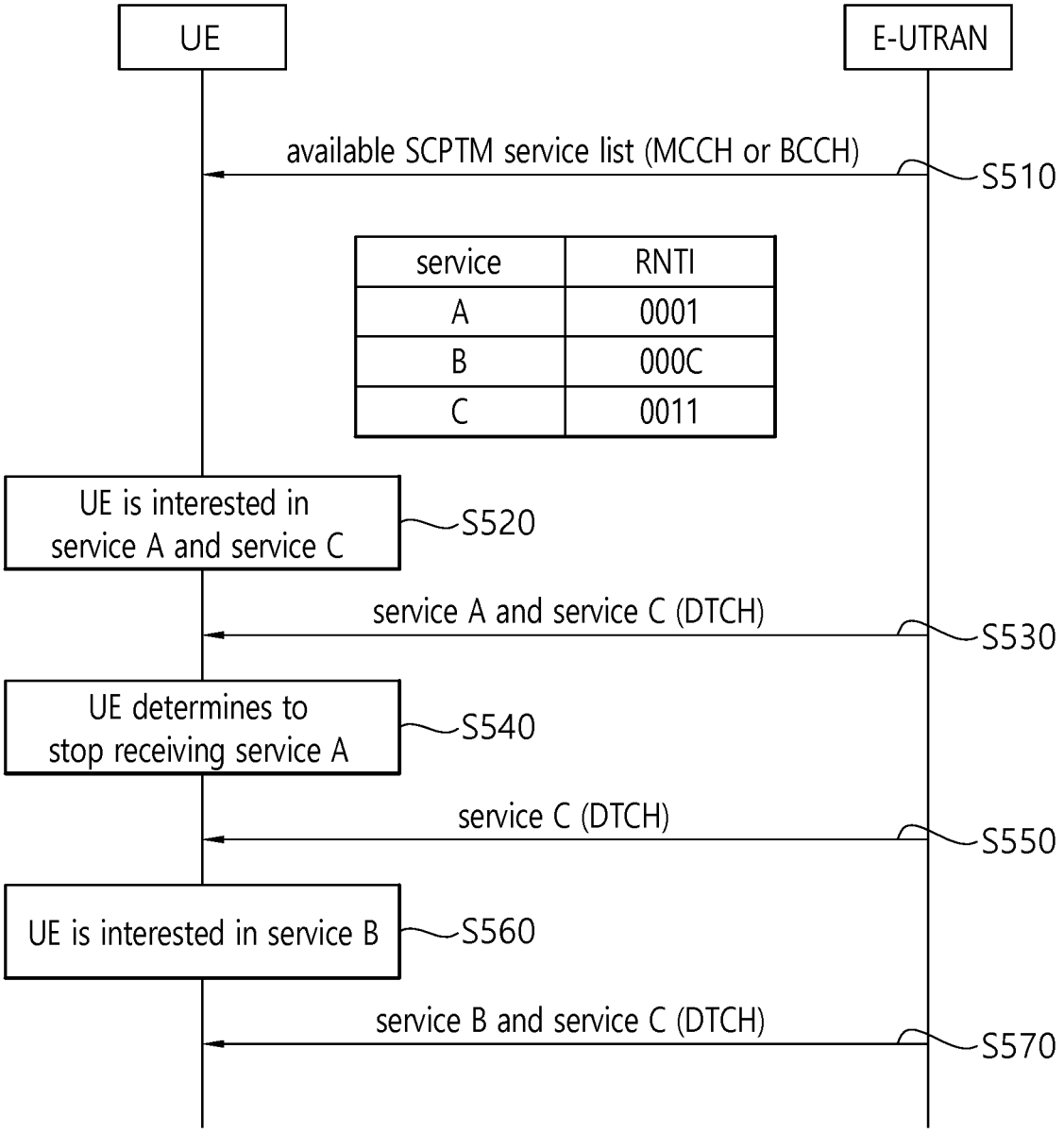
FIG. 5 shows a method in which a UE in an RRC_IDLE mode receives or stops an SCPTM service by using an SCPTM-RNTI according to an embodiment of the present invention.

FIG. 5 shows a method in which a UE in an RRC_IDLE mode receives or stops an SCPTM service by using an SCPTM-RNTI according to an embodiment of the present invention.

The UE may receive a list of available SCPTPM services from a serving cell (S510). The list of available SCPTM services may be broadcast through an MCCH or a BCCH. The list of available SCPTM services may include an SCPTM-RNTI corresponding to the available SCPTM services. The SCPTM-RNTI is an RNTI newly defined to receive the SCPTM service. In the embodiment of FIG. 5, the available SCPTM services are A, B, and C, and it is assumed that SCPTM-RNTIs corresponding to the services A, B, and C are respectively 0001", "000C", and "0011".

The UE is interested in the services A and C, and thus the UE may store a corresponding SCPTM-RNTI (S520).

The UE may receive the services A and C through SCPTM transmission by using each of the stored SCPTM-RNTIs, that is, by using "0001" and "0011" (S530).

If the UE is no longer interested in the service A, the UE may determine to stop receiving the service A. Therefore, the UE may release the SCPTM-RNTI (i.e., "0001") of the service A (S540). The UE may release the SCPTM RNTI (i.e., "0001") corresponding to the service A to avoid unnecessary monitoring or decoding of a PDCCH.

The UE may maintain reception of the service C through SCPTM transmission since an SCPTM-RNTI (i.e., "0011") corresponding to the service C is still stored therein.

If the UE is additionally interested in the service B, the UE may read the MCCH or the BCCH to acquire an SCPTM-RNTI (e.g., "000C") corresponding to the service B (S560).

The UE may receive the services B and C through SCPTM transmission by using each of the stored SCPTM-RNTIs (i.e., "000C" and "0011") (S570).

Figure 6:
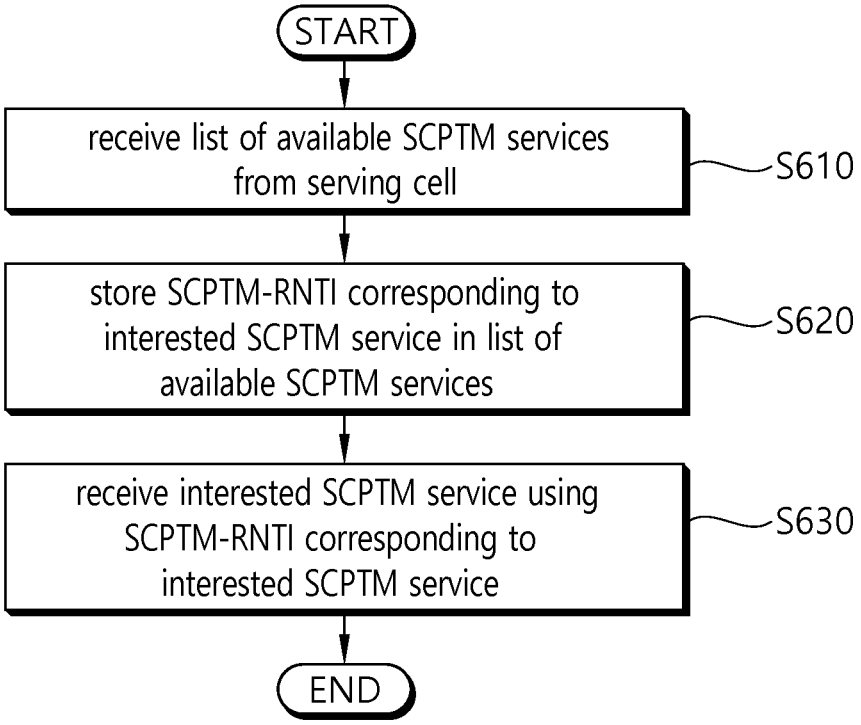
FIG. 6 is a block diagram showing a method in which a UE in an RRC_IDLE mode acquires an SCPTM-RNTI according to an embodiment of the present invention.

FIG. 6 is a block diagram showing a method in which a UE in an RRC_IDLE mode acquires an SCPTM-RNTI according to an embodiment of the present invention.

The UE may receive a list of available SCPTM services from a serving cell (S610). The list of available SCPTM services may include an SCPTM-RNTI corresponding to the available SCPTM services. The list of available SCPTM services may include at least any one of a service identity, a temporary mobile group identity (TMGI), and a session identity. The list of available SCPTM services may be broadcast through a broadcast control channel (BCCH) or a multicast control channel (MCCH).

The UE may store an SCPTM-RNTI corresponding to an interested SCPTM service in the received list of available SCPTM services (S620). One or more SCPTM-RNTIs may correspond to the interested SCPTM service.

The UE may receive the interested SCPTM service by using the stored SCPTM-RNTI corresponding to the interested SCPTM service (S630). If the UE is no longer interested in a specific SCPTM service, the SCPTM-RNTI corresponding to the interested SCPTM service may be released.

Figure 7:
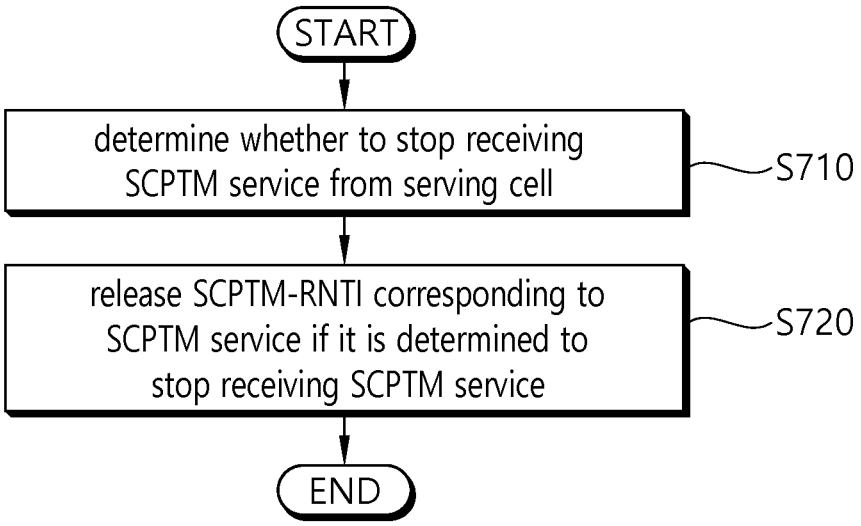
FIG. 7 is a block diagram showing a method in which a UE in an RRC_IDLE mode releases an SCPTM-RNTI according to an embodiment of the present invention.

FIG. 7 is a block diagram showing a method in which a UE in an RRC_IDLE mode releases an SCPTM-RNTI according to an embodiment of the present invention.

The UE may determine whether to stop receiving an SCPTM service from a serving cell (S710). If the UE is no longer interested in a specific SCPTM service, it may be determined to stop receiving the specific SCPTM service.

If the UE determines to stop receiving the SCPTM service, an SCPTM-RNTI corresponding to the SCPTM service may be released (S720). This is to prevent the UE from unnecessarily performing monitoring and decoding on a PDCCH. The UE may release the SCPTM-RNTI corresponding to the SCPTM service to stop monitoring a PDCCH corresponding to the SCPTM service.

Figure 8:
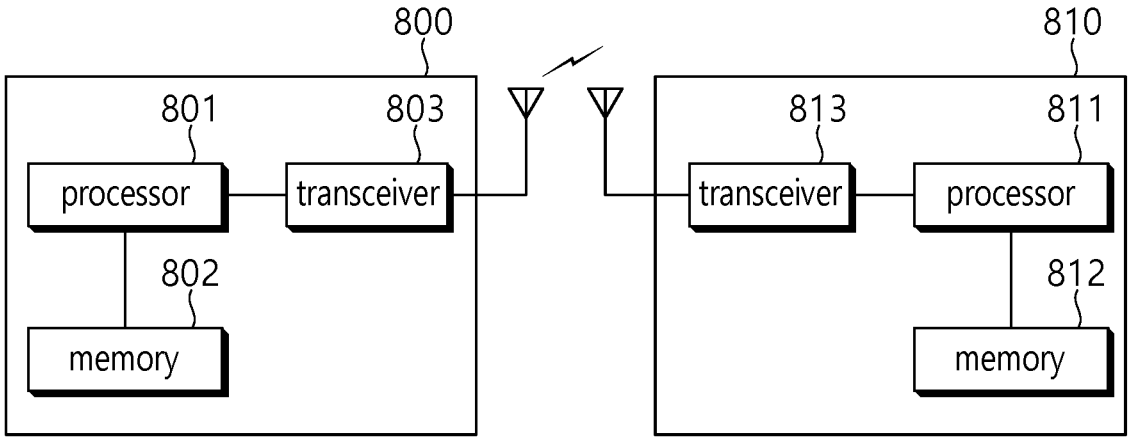
FIG. 8 is a block diagram illustrating a wireless communication system according to the embodiment of the present invention.

FIG. 8 is a block diagram illustrating a wireless communication system according to the embodiment of the present invention.

A BS 800 includes a processor 801, a memory 802 and a transceiver 803. The memory 802 is connected to the processor 801, and stores various information for driving the processor 801. The transceiver 803 is connected to the processor 801, and transmits and/or receives radio signals. The processor 801 implements proposed functions, processes and/or methods. In the above embodiment, an operation of the base station may be implemented by the processor 801.

A UE 810 includes a processor 811, a memory 812 and a transceiver 813. The memory 812 is connected to the processor 811, and stores various information for driving the processor 811. The transceiver 813 is connected to the processor 811, and transmits and/or receives radio signals. The processor 811 implements proposed functions, processes and/or methods. In the above embodiment, an operation of the UE may be implemented by the processor 811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a user equipment (UE) in a wireless communication system, the method comprising:

receiving, by the UE, a list of [available single-cell point-to-multipoint (SCPTM)] services broadcasted from a serving cell via a broadcast control channel (BCCH) or a multicast control channel (MCCH), while staying in a radio resource control (RRC) idle state, wherein the list of the [available SCPTM] services includes [SCPTM-] radio network temporary identities (RNTIs) of the [available SCPTM] services and service identities of the [available SCPTM] services, *wherein the services correspond to a multicast broadcast service*;

determining, by the UE, an interested [SCPTM] service[;

determining, by the UE, that a service] *based on an* identity [of] *related to* the interested [SCPTM] service [is included in the list of available SCPTM services, wherein the service identity of the interested SCPTM service is] obtained from a user service description (USD);

[storing, by the UE, only a SCPTM-RNTI of the interested SCPTM service included in the list of the available SCPTM services;]

monitoring, by the UE, [a dedicated traffic channel (DTCH)] *a physical downlink control channel (PDCCH)* based on [the stored SCPTM-] *an* RNTI *of the interested service included in the list of the services*; and receiving, by the UE, the interested [SCPTM] service [via the DTCH].

2. The method of claim 1, further comprising:

determining, by the UE, not to receive the interested [SCPTM] service; and releasing the [SCPTM-] RNTI of the interested [SCPTM] service.

3. The method of claim 2, further comprising stopping monitoring the [DTCH corresponding to] *RNTI of* the interested [SCPTM] service.

4. The method of claim 1, wherein the list of [available SCPTM] services further comprises at least any one of a temporary mobile group identity (TMGI), and a session identity.

5. A user equipment (UE) *adapted to operate* in a wireless communication system, the UE comprising:

a memory *storing instructions*;

a transceiver; and a processor operatively [coupled] *connectable* to the memory and the transceiver, wherein *the instructions, based on being executed by* the processor [is configured for], *cause the processor to perform operations comprising*:

[receiving] *controlling the transceiver to receive* a list of available [single-cell point- to-multipoint (SCPTM)] services broadcasted from a serving cell via a broadcast control channel (BCCH) or a multicast control channel (MCCH), while staying in a radio resource control (RRC) idle state, wherein the list of the [available SCPTM] services includes [SCPTM-radio] *radio* network temporary identities (RNTIs) of the [available SCPTM] services and service identities of the [available SCPTM] services, *wherein the services correspond to a multicast broadcast service*;

determining an interested [SCPTM] service[;

determining, by the UE, that a service] *based on an* identity [of] *related to* the interested [SCPTM] service [is included in the list of available SCPTM services, wherein the service identity of the interested SCPTM service is] obtained from a user service description (USD);

[storing, in the memory, only a SCPTM-RNTI of the interested SCPTM service included in the list of the available SCPTM services;]

monitoring[, by the UE, a dedicated traffic channel (DTCH)] *a physical downlink control channel (PDCCH)* based on [the stored SCPTM-RNTI] *an RNTI of the interested service included in the list of services*; and

[receiving] *controlling the transceiver to receive* the interested [SCPTM] service [via the DTCH].

6. The UE of claim 5, wherein the [processor is] *operations* further [configured for] *comprise*:

determining, by the UE, not to receive the interested [SCPTM] service;

releasing the [SCPTM-] RNTI of the interested [SCPTM] service; and stopping monitoring the [DTCH corresponding to] *RNTI of* the interested [SCPTM] service.

* * * * *